INVENTOR.
HOYT W. WATTS
BY
ATTORNEY

July 30, 1963 H. W. WATTS 3,099,321
AUTOMATIC VARIABLE PITCH PROPELLER
Filed Aug. 28, 1961 5 Sheets-Sheet 4

INVENTOR.
HOYT W. WATTS
BY
ATTORNEY

July 30, 1963   H. W. WATTS   3,099,321
AUTOMATIC VARIABLE PITCH PROPELLER
Filed Aug. 28, 1961   5 Sheets-Sheet 5
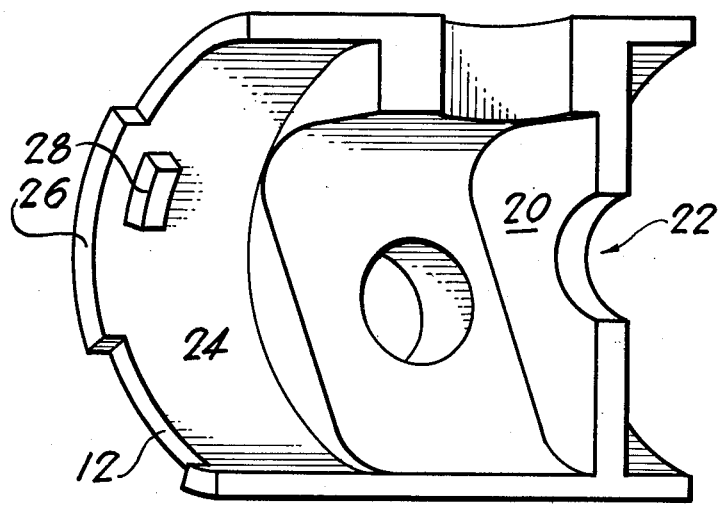
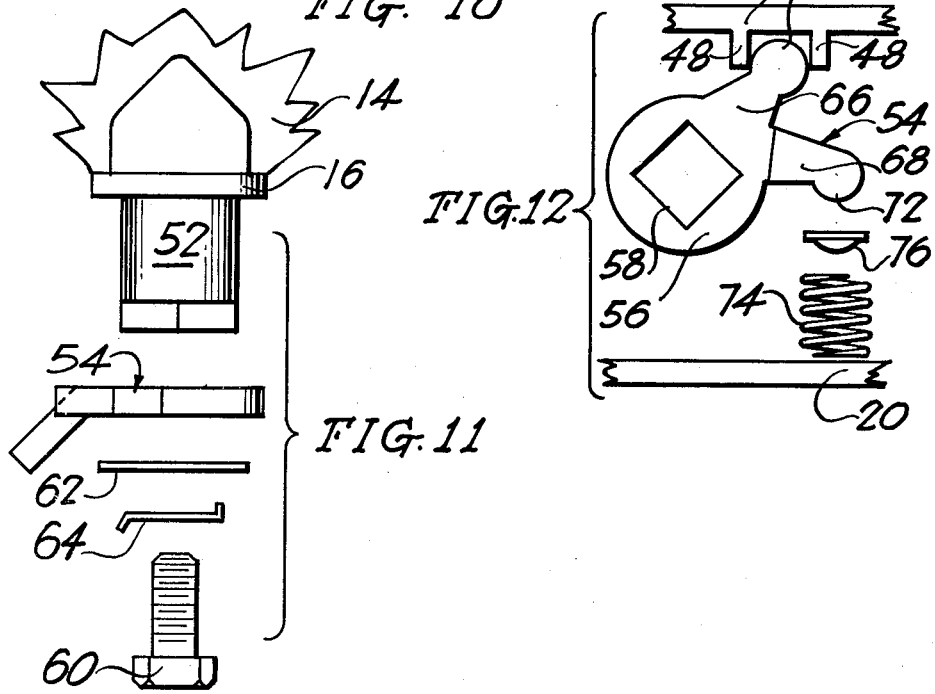
INVENTOR.
HOYT W. WATTS
BY
ATTORNEY United States Patent Office 3,099,321
Patented July 30, 1963

3,099,321
AUTOMATIC VARIABLE PITCH PROPELLER
Hoyt W. Watts, 3034 Shallowford Road, Chamblee, Ga.
Filed Aug. 28, 1961, Ser. No. 134,263
8 Claims. (Cl. 170—160.16)

This invention relates to an automatic variable pitch propeller and particularly to propellers of this sort which are used with marine engines, outboard engines and the like, for automatically adjusting the pitch of the propeller blades from a low pitch when initially overcoming the starting momentum to a higher pitch after the boat is underway.

Automatically variable pitch propellers are known and disclosed in the prior art. Some of these devices operate strictly on the principle of centrifugal action transferred to the blade mechanism for operating same. Other devices employ semi-annual operation requiring judgment or dexterity of the operator. One objection to some power devices resides in the mechanical relationship between the parts which renders the devices susceptible to deterioration and malfunction after they have been exposed repeatedly to water and corrosion and the like. For various other reasons, the prior art devices are not considered to achieve the objectives of the instant invention which employs a novel relationship of mechanical parts to achieve the automatically operated pitch change in the propeller.

Generally described, without restriction on the scope of my invention as defined in the appended claims, the instant device employs an outer stationary housing or hub of generally cylindrical formation having two or more propeller blade bosses formed therein radially supporting propeller blades therein for slight rotational movement to adjust the pitch thereof. Each blade has connected thereto in the interior of the outer hub a blade rocker arm device normally spring biased by means of a coil spring interposed there against and against a solid baffle wall formed by casting or the like on the interior of the outer hub. Each rocker arm has a projecting cam ball member which is adapted to fit into respective seats formed in a movable hub mounted within the outer stationary hub. The inner hub has tapered lugs formed on the outer periphery thereof, there being one for each of the blades, and also has formed thereon the seats in which are fitted the ball cam members of the respective rocker arms. The inner face of the outer hub has high speed or high pitch locking lugs formed thereon which are adapted to be engaged in a high pitch position by pivotally mounted latching pawl members spring biased normally in an unlatched position. In high pitch position with the power on and the boat underway, the pawls engage the lugs in high pitch position to prevent relative motion between the inner hub and the outer hub and to maintain the propeller blades in high pitch. In low pitch position, the opposite is true and the inner and outer hubs are in engagement with each other at maximum distance from the high pitch position. The spring bias of the pawls tends to snap the pawls into position against the lugs after the hubs have reached high pitch position. In neutral position, when the boat is stopped or the power is off, the pawls are disengaged. According to the operation of the foregoing arrangement, when the boat is at rest and about to get underway, the pawls are in unlatched position and the rocker arms maintain the respective propeller blades at low pitch position. Upon initial application of power through the inner hub, the power is transferred through the low pitch of the propeller blades and the maximum amount of power is applied in the water to overcome the momentum of the boat. As the boat overcomes the initial momentum and gains speed, the resistance of the propeller blades against the respective rocker arms causes a reverse movement between the inner and outer hubs thereby causing the inner hub to move to a high pitch position shifting the respective blades to a high pitch position; and after the blades have reached maximum high pitch position, the pawls latch in the lugs to maintain the propeller blades in this position until the conditions change, as when power is reduced and the boat begins to slow down.

A primary object of this invention is to provide an automatically adjustable propeller which responds readily to changes in conditions for low pitch position to high pitch position.

Another object of this invention resides in the construction whereby individual rocker arms are used with each respective blade and are spring biased so that the pressure of the spring is balanced against the force exerted on the blade thereby to provide a fairly accurate adjustment of the propeller from low pitch to high pitch position.

Another object of this invention resides in the use of an outer hub and an inner hub having latching means therebetween automatically operable to latch the hubs in high pitch position after the propeller blades have achieved high pitch conditions.

Still another object of this invention resides in the use of an outer cylindrical housing having an inner movable hub therein carrying both the high speed latching means thereon for engagement with the outer cylindrical housing as well as having seat means thereon which receives the spring biased action of individual rocking arms for each of the variable pitch blades.

An additional object of the present invention resides in the use of purely mechanical parts normally sealed inside of a hub by means of suitable hub cap members, and none of said parts are actions being extremely critical as would be affected by the normal action of water and the like.

Other and further objects and advantages of my invention will become apparent upon reading the following specification taken in conjunction with the accompanying drawings, in which:

FIG. 10 is a perspective view in cutaway of the outer hub shown in FIG. 6, and taken substantially along lines 10—10 in FIG. 6.

FIG. 11 is an exploded view of the rocker arm and blade detail.

FIG. 12 is a view of the blade adjusting means.

Figures 1, 2:
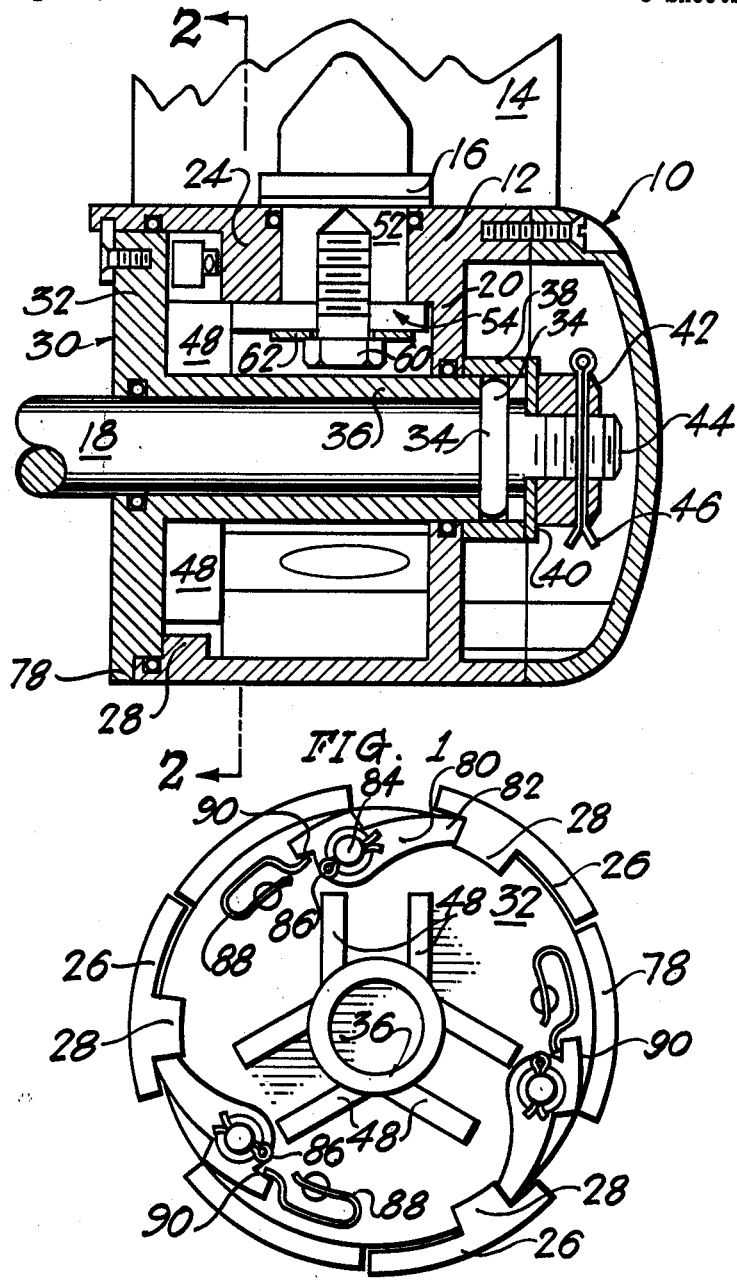
FIG. 1 is a vertical cross-section view of an assembled propeller constructed in accordance with the present invention and with some of the propeller blades omitted.
FIG. 2 is a cross-sectional view taken substantially along the lines 2—2 in FIG. 1, and showing the high pitch locks in latched high pitch position.

Referring initially to the assembled device shown in FIG. 1, which is designated overall and generally by the reference numeral 10, an outer cylindrical hub which is particularly adapted to be cast or molded from any suitable metal or other material carries the reference number 12 and is adapted to form the outer housing normally stationary on the motor. Mounted in arcuate relationship on the exterior of hub 12 are a plurality of adjustable blades 14 suitably mounted in propeller blade bosses 16 formed on the surface of hub 12. Blades 14 are adapted to be rotated slightly about their central axis which radiates from the longitudinal axis of a power drive shaft member 18 supported in suitable motor frame work (not shown) and adapted to be connected by conventional structure with the piston drive mechanism of an outboard or inboard engine. The interior of hub 12 is formed or otherwise provided with a rear wall 20 having a shaft opening 22 therein and hub 12 is also provided with a front partial wall 24 providing an opening in which the other mechanism hereinafter to be described may actuate. The front end (such being designated as the end closest to the motor and rear of the boat) of hub 12 is provided with spaced locking flanges 26, each having a depending locking lug 28 formed thereon.

Rigidly mounted and attached to shaft 18 and inside of the outer housing 12 is a quill shaft and housing 30 having an inner hub 32 formed therewith for movement inside of outer hub 12. Shaft 18 is attached to the housing of quill shaft and housing 30 by means of a shear pin 34 passing through shaft 18 and into a portion of the housing 36. This end of the shaft 18 and housing 34 is covered by a retainer 38 covered by a flat washer 40 held in place by a nut 42 readily engaging the threaded end 44 of shaft 18 and firmly fixed in place by means of a cotter key 46. The end of housing 36 is mounted in the hole 22 in the wall 20 of housing 12.

The inside face of hub 32 is provided with a series of spaced pairs of projecting blocks 48, each pair together forming a space on the housing 36. There are three pairs of spaced blocks 48 arranged to correspond with each of the adjustable blade members 14 of the present embodiment, and it being understood that there would be one of these for each of the blades in any embodiment, depending upon the particular number of blades selected for that motor and that propeller. Fixedly secured to the bottom of blades 14 in the cylindrical attachment portion 52 thereof is a blade adjusting rocker arm member 54 shown in better detail in both FIGS. 11 and 12. Rocker arm 54 comprises a central substantially circular body portion 56 having a rectangular opening 58 formed therein which is fitted to the bottom of the portion 52 of blade 14 and attached in place by means of a hex nut 60 and a washer 62 and a lock washer 64. There are two arms 66, 68 formed on the rocker arm 54, and each has a respective ball portion 70, 72 thereon. Ball portion 70 is positioned in and operates in the groove formed between a respective and corresponding pair of block members 48 on the inner hub 32. Arm 68 is inclined generally in the direction of the inner wall 20 of outer hub 12 and is adapted to act against a coil spring 74 by means of a ball cap member 76 positioned therein. According to this arrangement, the movement of the inner hub 32 and shaft 18 with respect to the outer hub 12 causes a response and movement of the ball member 54 against the action of spring 74 and, since blade 14 is mounted with rocker 54, the blade responds in motion about its own longitudinal axis (which is radially of the longitudinal axis of shaft 18) in order to adjust the pitch of the blade from low pitch to high pitch, and vice versa. When the motor is a rest and no power is on, the blade is in high pitch, and as the motor power is applied through shaft 18, almost instantaneously the high pitch position of the blades 14 is shifted to low pitch which acts against the water to provide more contact therewith to give increased power to overcome the initial momentum of the weight of the motor, the boat, the occupants and other static weight. As the momentum is overcome and the weight increases in motion, the speed of the blades 14 in the water is greater and therefore the effect of the increased force overcomes each respective spring 74 and tends to shift the individual blades 14 of the propeller about their respective longitudinal axis to change them from the low pitch to a higher pitch position. Once the boat is underway and the need for the low pitch position has expired, it is possible to shift the propeller 10 from low pitch to high pitch manually by suddenly decreasing the power delivered by the engine to shaft 18 and momentarily long enough for relative motion to take place between members 26 and 78. The centrifugal force of the movement of members 82 already has caused them to move outwardly and the momentary loss of power will cause the members 80 to shift into locked position. Automatic shifting of the device from low pitch back to high pitch is a matter of careful design of the springs 74 and other parts and it may be worthwhile to use the manual method particularly after the springs have become changed from constant use.

Figure 3:
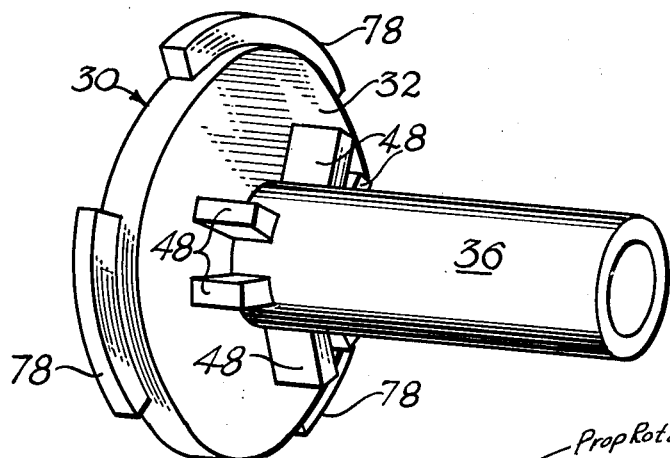
FIG. 3 is a perspective view of the inner hub of the propeller shown in FIG. 1.
Figure 4:
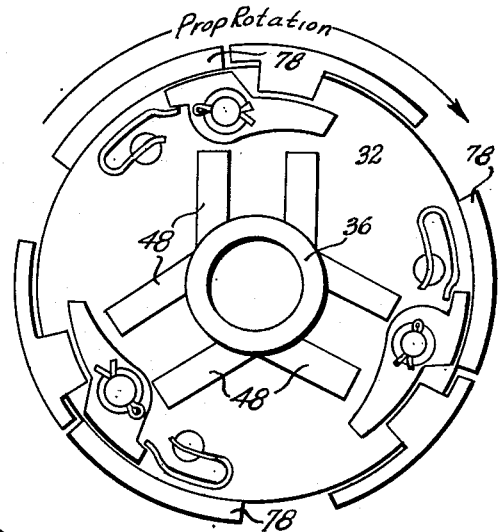
FIG. 4 is an elevation view of the hub shown in FIG. 3, looking at the hub from the rear of the propeller shown in FIG. 1.
Figure 5:
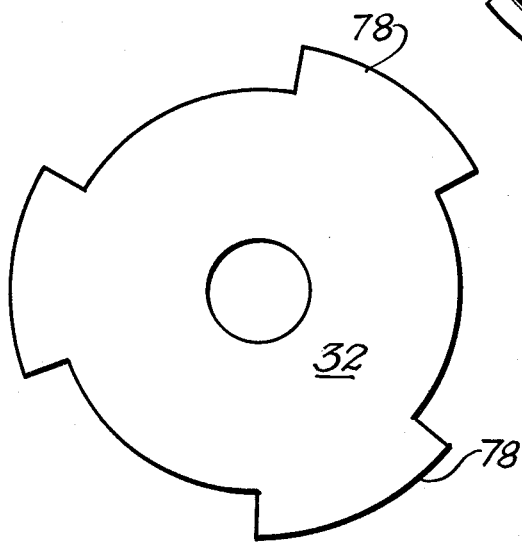
FIG. 5 is an elevation view looking at the hub shown in FIG. 3 from the other direction from that shown in FIG. 4.
Figure 6:
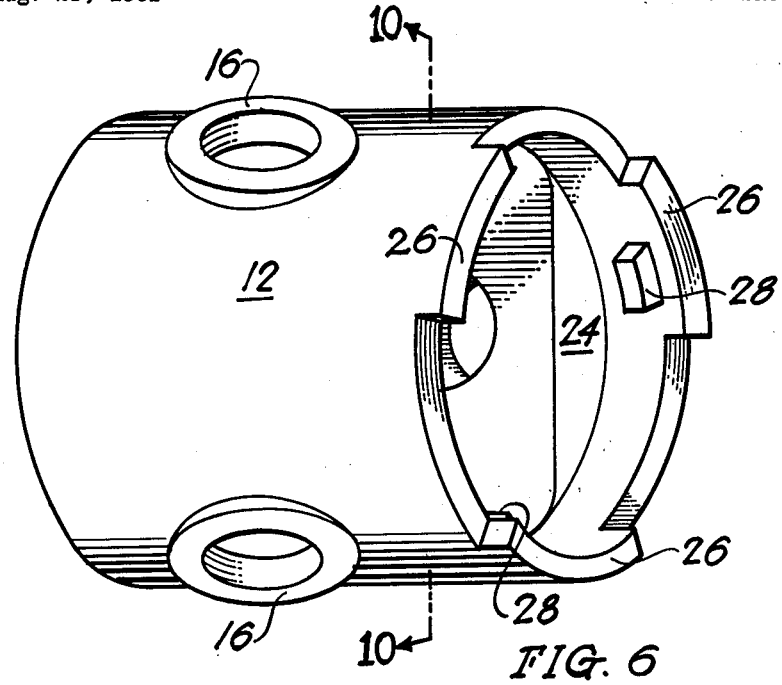
FIG. 6 is a perspective view of the outer cylindrical hub of the propeller shown in FIG. 1.

Inner hub 32 has three elongated latching fingers or lugs 78 formed thereon and which are clearly shown in FIGS. 3, 4 and 5. The latching fingers or lugs 78, when the inner hub 32 is properly positioned within outer hub 12, are in natural alignment with the lugs 26 formed on the outer housing 12 and actually occupy a portion of the discontinuous space between the ends of the lugs 26 on housing 12. High pitch latching pawls 80 comprising a finger portion 82 are pivotally mounted on respective shafts 84 locked in place by cotter pins 86 on the outer face of inner hub 32 and each pawl 80 is normally spring biased by a leaf spring 88 retained on the face of inner hub 32 to be engaged by a ledge 90 formed on each of the pawls 80. The leaf springs 88 normally bias the high speed latching pawls to a downward position out of contact with the respective lugs 28 but are pivoted against the action of springs 88 by centrifugal force as the motion of inner hub 32 increases following the initial starting of the propeller 10 into movement.

Figure 7:
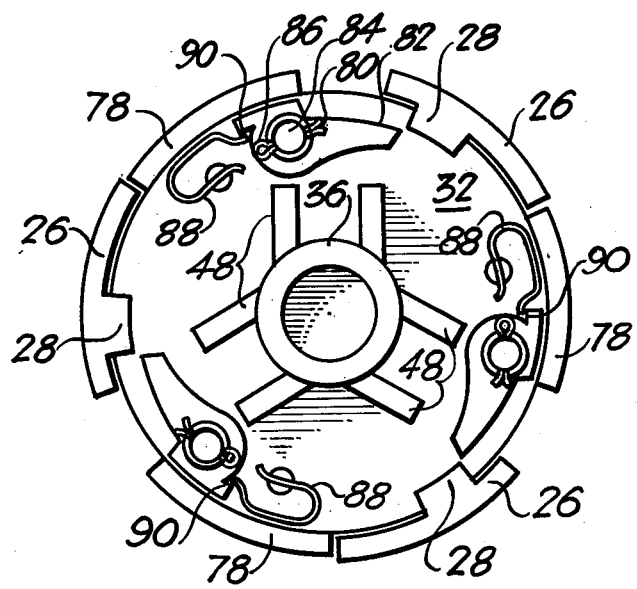
FIG. 7 is an elevation view of the inner and outer hub taken substantially along the same lines as in the cross-sectional view in FIG. 2 but with the high pitch locks shown in neutral position.
Figure 8:
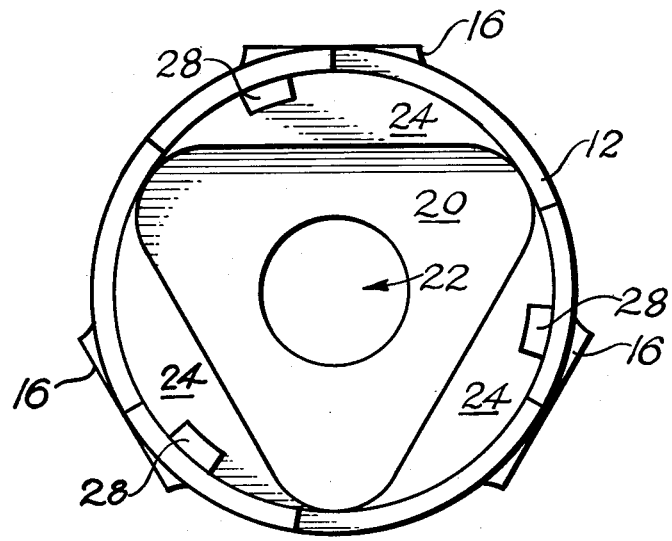
FIG. 8 is an elevation view looking toward the rear of the propeller shown in FIG. 1 into the outer cylindrical hub thereof with the hub cap removed.
Figure 9:
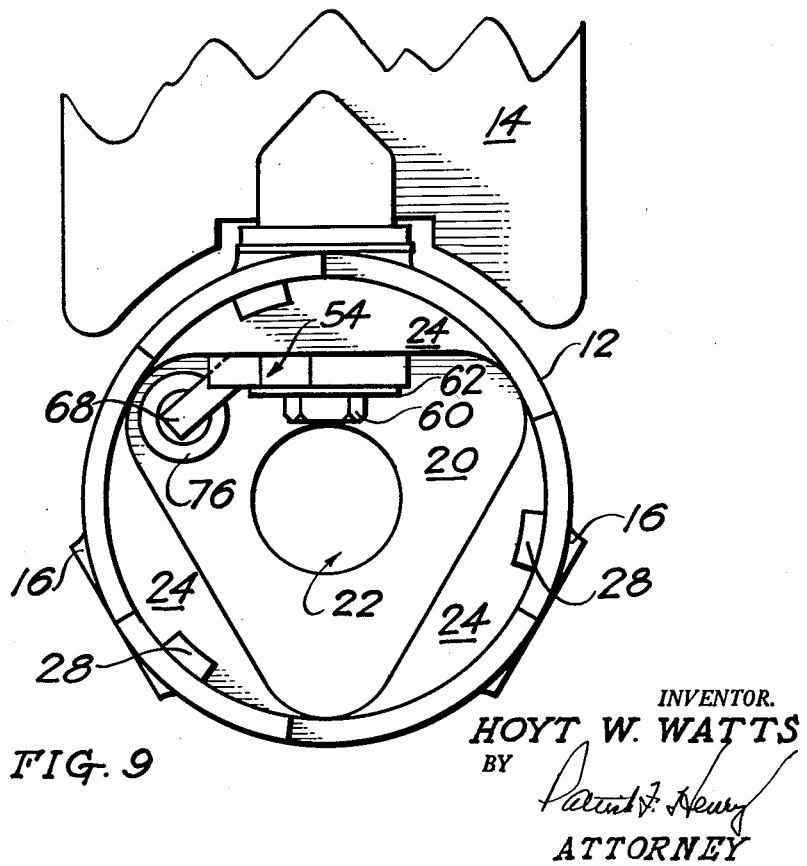
FIG. 9 is an elevation view looking at the hub shown in FIG. 8 from the opposite direction.

As readily seen in FIG. 7, in a static or at rest position when there is no power on shaft 18, and when the boat, for example, is at rest the latching pawls 80 are out of contact below the respective lugs 28 and the fingers 78 on inner hub 32 are in spaced relation with respect to the lugs 26 on outer hub 12. In low pitch position, following the application of power to shaft 18, as when the boat initially starts to get underway, the lugs 78 shift into engagement and contact the lugs 26 and the high pitch locks are still below the lugs 28. As the power increases and the distance between the lugs 28 and 78 increases the centrifugal force acting upon each of the pawls 80 pulls the end 82 upwardly against the action of spring 88 and as soon as the lugs 28 have cleared the end 82, the end 82 will snap into position against the inner face of respective lugs 28 maintaining the inner hub 32 in a fixed relation with respect to outer hub 12 and substantially latching the blades 14 in high pitch position. As power is decreased, as for example when the boat is slowed, the reverse action takes place and the pawls 82 will drop out of position and the lugs 28 will ride over the top thereof and the inner hub 32 will move with respect to the outer hub 12 and return to initial low pitch position or to static position as shown in FIG. 7.

While I have shown and described a particular embodiment of my invention, this is not to be construed as any sort of limitation on the scope of my invention since various alterations, changes, substitutions, eliminations, variations and deviations may be made in the embodiment shown and described herein without departing from the scope of my invention as defined in the appended claims.

I claim:

1. In an automatically adjustable variable pitch propeller, an outer housing comprising an outer hub having a plurality of propeller blades movably mounted thereon and being movable for a limited amount to adjust from a low pitch to a high pitch position, an inner member within said outer housing mounted for movement relative thereto, a power shaft connected to said inner member and adapted to provide power thereto, means on said inner member engageable with said outer housing in one position thereof to engage said housing and drive same in a low pitch position to rotate said outer housing with said blades thereon in low pitch position, pitch adjustment means for said blades operated by said inner member and said outer hub rotating relative to one another thereby adjusting said blades from high pitch to low pitch position and vice versa, and means interposed between said pitch adjustment means and said inner member normally biasing same, whereby said propeller in initial position with power on said shaft and with the initial momentum of the weight to be overcome is in a low pitch position to offer more surface engagement with the water; and whereupon, upon increased rotation of said blades and increase in revolutions said blades are automatically moved from a low pitch to a high pitch position.

2. In an automatically adjustable variable pitch propeller, an outer housing having an outer hub and a plurality of propeller blades movably mounted thereon and being movable for a limited amount to adjust from a low pitch to a high pitch position, an inner hub within said outer housing mounted for movement relative thereto, a power shaft connected to said inner hub and adapted to provide power thereto, means on said inner hub engageable with said outer hub in one position thereof to engage said hub and drive same in a low pitch position to rotate said outer housing with said blades thereon in low pitch position, said inner hub operable by said means engageable with said outer hub as said inner hub rotates relative to said outer hub thereby adjusting said blades from high pitch to low pitch position and vice versa, means resiliently resisting said movement of said blades, whereby said propeller in initial position with power on said shaft and with the initial momentum of the weight to be overcome is in a low pitch position to offer more surface engagement with the water; and whereupon, upon increased rotation of said blades and increase in revolutions said blades are automatically moved from a low pitch to a high pitch position.

3. In an automatically adjustable variable pitch propeller, an outer housing having a plurality of propeller blades movably mounted thereon and being movable for a limited amount to adjust from a low pitch to a high pitch position, a power shaft engageable with said housing to provide power thereto and being movable relative thereto, means on said shaft engageable with said outer housing in one position thereof to engage said housing and drive same in a low pitch position to rotate said outer housing with said blades theron in low pitch position, pitch adjustment means for said blades operated as said shaft moves relative to said outer housing thereby adjusting said blades from high pitch to low pitch position and vice versa, resilient means interposed between said pitch adjustment means and said shaft whereby said propeller in initial position with power on said shaft and with the initial momentum of the weight to be overcome is a low pitch position to offer more surface engagement with the water; and whereupon upon increased rotation of said blades and increase in revolutions, said blades are automatically moved from a low pitch to a high pitch position and automatically returns to low pitch when the power is reduced.

4. In an automatically adjustable variable pitch propeller, an outer housing having a plurality of propeller blades movably mounted thereon and being movable for a limited amount to adjust from a low pitch to a high pitch position, a power shaft engageable with said housing and to provide power thereto and being movable relative thereto, means on said shaft engageable with said outer housing in one position thereof to engage said housing and drive same in a low pitch position to rotate said outer housing with said blades thereon in low pitch position, pitch adjustment means for said blades operated as said shaft rotates relative to said outer hub thereby adjusting said blades from high pitch to low pitch position and vice versa, spring means interposed between said blade adjusting means and said shaft, high pitch locking means movably mounted on said shaft and adapted to move in response to the centrifugal force as said housing increases in rotation, means normally biasing said locking means into unlatched position and normally resisting the movement of same in response to centrifugal action, means on said housing engageable with said high pitch locking means to engage same in a high pitch position and to lock therewith to prevent movement of said outer housing with respect to said shaft, said locking means becoming automatically unlocked upon reduction of rotational force thereon and the corresponding reduction of centrifugal action whereby said locking means are unlocked and said shaft is permitted to rotate with respect to said outer housing, whereby said propeller in initial position with power on said shaft and with the initial momentum of the weight to be overcome is in a low pitch position to offer more surface engagement with the water; and whereupon upon increased rotation of said blades and increase in revolutions, said blades are automatically moved from a low pitch to a high pitch position and whereupon in high pitch position said locking means engage said housing to lock said propeller in high pitch position until the revolutions are reduced and the power is diminished.

5. In an automatically adjustable variable pitch propeller, an outer housing having a plurality of propeller blades movably mounted thereon and being movable for a limited amount to adjust from a low pitch to a high pitch position, an inner hub within said outer housing mounted for movement relative thereto, a power shaft connected to said inner hub and adapted to provide power thereto, means on said inner hub engageable with said outer housing in one position thereof to engage said housing and drive same in a low pitch position to rotate said outer housing with said blades thereon in low pitch position, pitch adjustment members mounted on said blades and having a portion thereof engageable with said inner hub to be moved thereby as said inner hub rotates relative to said outer hub thereby adjusting said blades from high pitch to low pitch position and vice versa, spring means interposed between said blade adjusting means and said inner hub, whereby said propeller in initial position with power on said shaft and with the initial momentum of the weight to be overcome is in a low pitch position to offer more surface engagement with the water; and whereupon, upon increased rotation of said blades and increase in revolutions said blades are automatically moved from a low pitch to a high pitch position.

6. In an automatically adjustable variable pitch propeller, an outer housing having a plurality of propeller blades movably mounted thereon and being movable for a limited amount to adjust from a low pitch to a high pitch position, an inner member within said outer housing mounted for movement relative thereto, a power shaft connected to said inner member and adapted to provide power thereto, means on said inner member engageable with said outer housing in one position thereof to engage said housing and drive same in a low pitch position to rotate said outer housing with said blades thereon in low pitch position, pitch adjustment means for said blades operated as said inner member rotates relative to said outer hub thereby adjusting said blades from high pitch to low pitch position and vice versa, spring means interposed between said pitch adjustment means and said inner member, high pitch locking means movably mounted on said inner member and adapted to move in response to the centrifugal force as said housing increases in rotation, means normally biasing said locking means into unlatched position and normally resisting the movement of same in response to centrifugal action, means on said housing engageable with said high pitch locking means to engage same in a high pitch position and to latch therewith to prevent movement of said outer housing with respect to said inner member, said locking means becoming automatically unlocked upon reduction of rotational force thereon and the corresponding reduction of centrifugal action whereby said locking means are unlocked and said inner member is permitted to rotate with respect to said outer housing, whereby said propeller in initial position with power on said shaft and with the initial momentum of the weight to be overcome is in a low pitch position to offer more surface engagement with the water; and whereupon, upon increased rotation of said blades and increase in revolutions, said blades are automatically moved from a low pitch to a high pitch position and whereupon in high pitch position said locking means engage said housing to lock said blades in high pitch position until the revolutions are reduced and the power is diminished.

7. In an automatically adjustable variable pitch propeller, an outer housing having a plurality of propeller blades movably mounted thereon and being movable for a limited amount to adjust from a low pitch to a high pitch position, an inner hub within said outer housing mounted for movement relative thereto, a power shaft connected to said inner hub and adapted to provide power thereto, means on said inner hub engageable with said outer housing in one position thereof to engage said housing and drive same in a low pitch position to rotate said outer housing with said blades thereon in low pitch position, blade adjustment means moved as said inner hub rotates relative to said outer housing thereby adjusting said blades from high pitch to low pitch position and vice versa, resilient means interposed between said blade adjusting means and said inner hub, high pitch locking members movably mounted on said inner hub and adapted to move in response to the centrifugal force as said hub increases in rotation, means on said housing engageable with said high pitch locking members to engage same in a high pitch position and to lock therewith to prevent movement of said outer housing with respect to said inner hub, said locking members becoming automatically unlocked upon reduction of rotational force thereon and the corresponding reduction of centrifugal action whereby said locking members are unlatched and said inner hub is permitted to rotate with respect to said outer housing, whereby said propeller in initial position with power on said shaft and with the initial momentum of the weight to be overcome is in a low pitch position to offer more surface engagement with the water; and whereupon, upon increased rotation of said blades and increase in revolutions said blades are automatically moved from a low pitch to a high pitch position and whereupon in high pitch position said latching members engage said housing to latch said propeller in high pitch position until the revolutions are reduced and the power is diminished.

8. In an automatically adjustable variable pitch propeller, an outer housing having a plurality of propeller blades movably mounted thereon and said blades being movable for a limited amount to adjust from a low pitch to a high pitch position, an inner hub within said outer housing mounted for movement relative thereto, a power shaft connected to said inner hub and adapted to provide power thereto, means on said inner hub engageable with said outer housing in one position thereto to engage said housing and drive same in a low pitch position to rotate said outer housing with said blades thereon in low pitch position, pitch adjustment members mounted on said blades and having a portion thereof engageable with said inner hub to be moved thereby as said inner hub rotates relative to said outer housing thereby adjusting said blades from high pitch to low pitch position and vice versa, spring means interposed between said pitch adjustment members and said inner hub, high pitch locking members movably mounted on said inner hub and adapted to move in response to the centrifugal force as said hub increases in rotation, spring means normally depressing said locking members into unlatched position and normally resisting the movement of same in response to centrifugal action, means on said housing engageable with said high pitch locking members to engage same in a high pitch position and to latch therewith to prevent movement of said outer housing with respect to said inner hub, said latching members becoming automatically unlatched upon reduction of rotational force thereon and the corresponding reduction of centrifugal action whereby said locking members are unlocked and said inner hub is permitted to rotate with respect to said outer housing, whereby said propeller in initial position with power on said shaft and with the initial momentum of the weight to be overcome is in a low pitch position to offer more surface engagement with the water; and whereupon, upon increased rotation of said blades and increase in revolutions said blades are automatically moved from a low pitch to a high pitch position and whereupon in high pitch position said locking members engage said housing to latch said propeller in high pitch position until the revolutions are reduced and the power is diminished.

References Cited in the file of this patent

UNITED STATES PATENTS 2,988,156    Coleman _____ June 13, 1961

FOREIGN PATENTS 470,002    Germany _____ Jan. 4, 1929
512,057    Great Britain _____ Aug. 29, 1939